US008733997B2

(12) United States Patent
Ling

(10) Patent No.: US 8,733,997 B2
(45) Date of Patent: May 27, 2014

(54) DISPLAY APPARATUS WITH DUAL SCREENS CAPABLE OF DISPLAYING IMAGES AND MERCHANDISE SAMPLES

(75) Inventor: Szu-Tung Ling, Tainan (TW)

(73) Assignee: LBC Technology Co., Ltd., Tainan (TW)

( * ) Notice: Subject to any disclaimer, the term of this patent is extended or adjusted under 35 U.S.C. 154(b) by 147 days.

(21) Appl. No.: 13/420,858

(22) Filed: Mar. 15, 2012

(65) Prior Publication Data

US 2012/0236571 A1 Sep. 20, 2012

(30) Foreign Application Priority Data

Mar. 16, 2011 (TW) ............................ 100204679 U

(51) Int. Cl.

*B64D 47/06* (2006.01)
*F21V 5/00* (2006.01)
*G09F 13/18* (2006.01)
*F21V 7/04* (2006.01)
*G09F 13/04* (2006.01)
*G09F 13/08* (2006.01)
*G02F 1/1335* (2006.01)
*G09G 5/00* (2006.01)
*G09F 13/00* (2006.01)

(52) U.S. Cl.

USPC ......... 362/559; 362/616; 362/97.1; 362/97.4; 349/16; 345/4; 40/442; 40/443; 40/577

(58) Field of Classification Search

USPC .......... 362/616, 559, 97.1, 97.4, 89; 345/4–9; 349/11, 12, 16, 15; 40/442, 443, 444, 40/452, 577, 219, 427, 448

See application file for complete search history.

(56) References Cited

U.S. PATENT DOCUMENTS

| | | | | |
|---|---|---|---|---|
| 1,652,636 | A * | 12/1927 | Paul | 40/442 |
| 1,698,220 | A * | 1/1929 | Craig | 40/444 |
| 4,677,777 | A * | 7/1987 | Hoffman et al. | 40/460 |
| 4,747,223 | A * | 5/1988 | Borda | 40/219 |
| 4,848,875 | A * | 7/1989 | Baughman et al. | 349/16 |
| 5,164,856 | A * | 11/1992 | Zhang et al. | 359/486.02 |
| 5,296,952 | A * | 3/1994 | Takatsu et al. | 349/77 |
| 5,416,617 | A * | 5/1995 | Loiseaux et al. | 349/1 |
| 5,686,979 | A * | 11/1997 | Weber et al. | 349/96 |
| 5,856,819 | A * | 1/1999 | Vossler | 345/102 |
| 6,457,286 | B1 * | 10/2002 | Eliyahu et al. | 52/171.3 |
| 6,975,455 | B1 * | 12/2005 | Kotchick et al. | 359/485.03 |
| 8,154,418 | B2 * | 4/2012 | Peterson et al. | 340/815.4 |
| 2002/0026734 | A1 * | 3/2002 | Bayrle et al. | 40/448 |

* cited by examiner

*Primary Examiner* — Peggy Neils
*Assistant Examiner* — Erin Kryukova
(74) *Attorney, Agent, or Firm* — Pillsbury Winthrop Shaw Pittman, LLP

(57) ABSTRACT

A display apparatus includes a housing formed with a front opening, a display unit disposed in the housing, and a lighting unit disposed in the housing for illuminating the display unit. The display unit includes a light-transmissive front display screen exposed through the front opening, and a light-transmissive rear screen disposed spacedly parallel to the front display screen. The rear screen is operable to have a first light transmittance, and a second light transmittance higher than the first light transmittance.

6 Claims, 10 Drawing Sheets

DISPLAY APPARATUS WITH DUAL SCREENS CAPABLE OF DISPLAYING IMAGES AND MERCHANDISE SAMPLES

CROSS-REFERENCE TO RELATED APPLICATION

This application claims priority to Taiwanese Application No. 100204679, filed on Mar. 16, 2011.

BACKGROUND OF THE INVENTION

1. Field of the Invention

The invention relates to a display apparatus, and more particularly to a display apparatus displaying a static image picture associated with dynamic image information corresponding to at least one sample of merchandise therein.

2. Description of the Related Art

Generally, a large-size advertising machine in a store is provided with a liquid crystal display (LCD) screen for displaying pre-stored advertisement images and information for advertisement purposes. Some advertisement designs utilize an electronic billboard for exhibition of static or dynamic advertisements, which are repeatedly displayed with the same brightness. Such an advertising machine or an electronic billboard cannot satisfy consumer's requirements for vivid and varying picture images, thereby resulting in inferior advertisement effects.

SUMMARY OF THE INVENTION

Therefore, an object of the present invention is to provide a display apparatus that can overcome the aforesaid drawbacks of the prior art.

According to the present invention, a display apparatus comprises a housing formed with a front opening, a display unit disposed in the housing, and a lighting unit disposed in the housing for illuminating the display unit. The display unit includes a light-transmissive front display screen exposed through the front opening, and a light-transmissive rear screen disposed spacedly parallel to the front display screen. The rear screen is operable to have a first light transmittance, and a second light transmittance higher than the first light transmittance.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
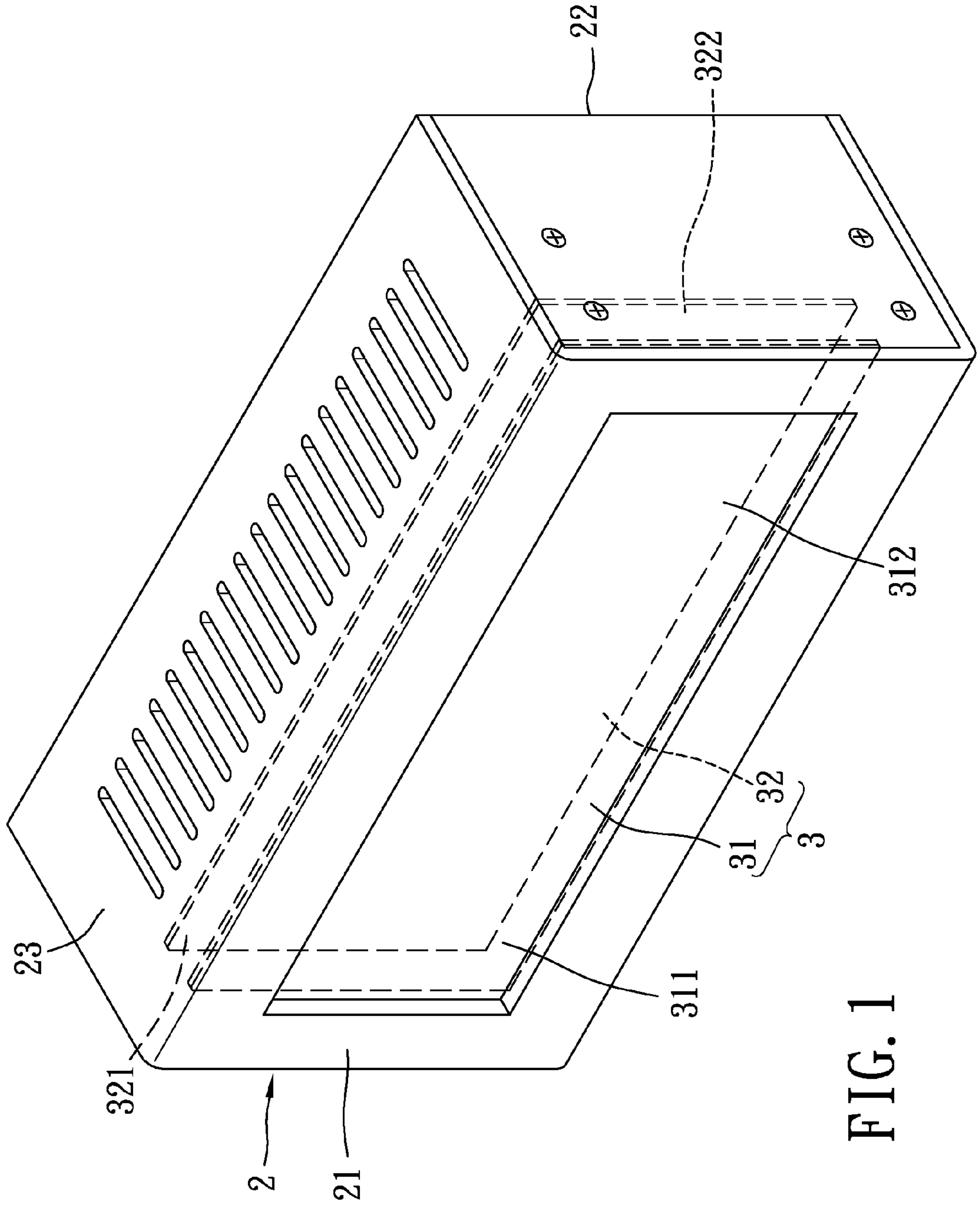
FIG. 1 is a perspective view showing the first preferred embodiment of a display apparatus of the present invention.

Before the present invention is described in greater detail, it should be noted that like elements are denoted by the same reference numerals throughout the disclosure.

Figure 2:
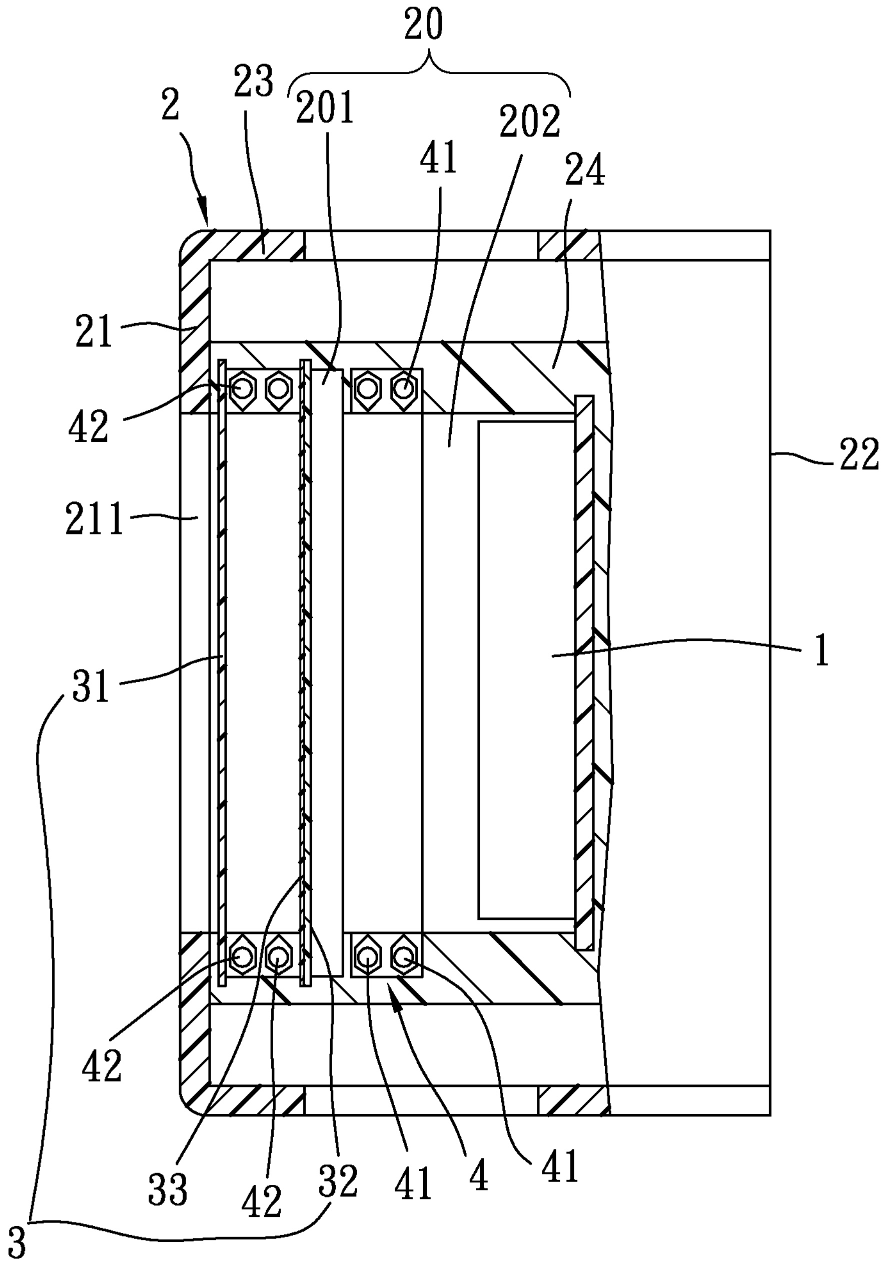
FIG. 2 is a schematic partly sectional view showing the first preferred embodiment.
Figure 4:
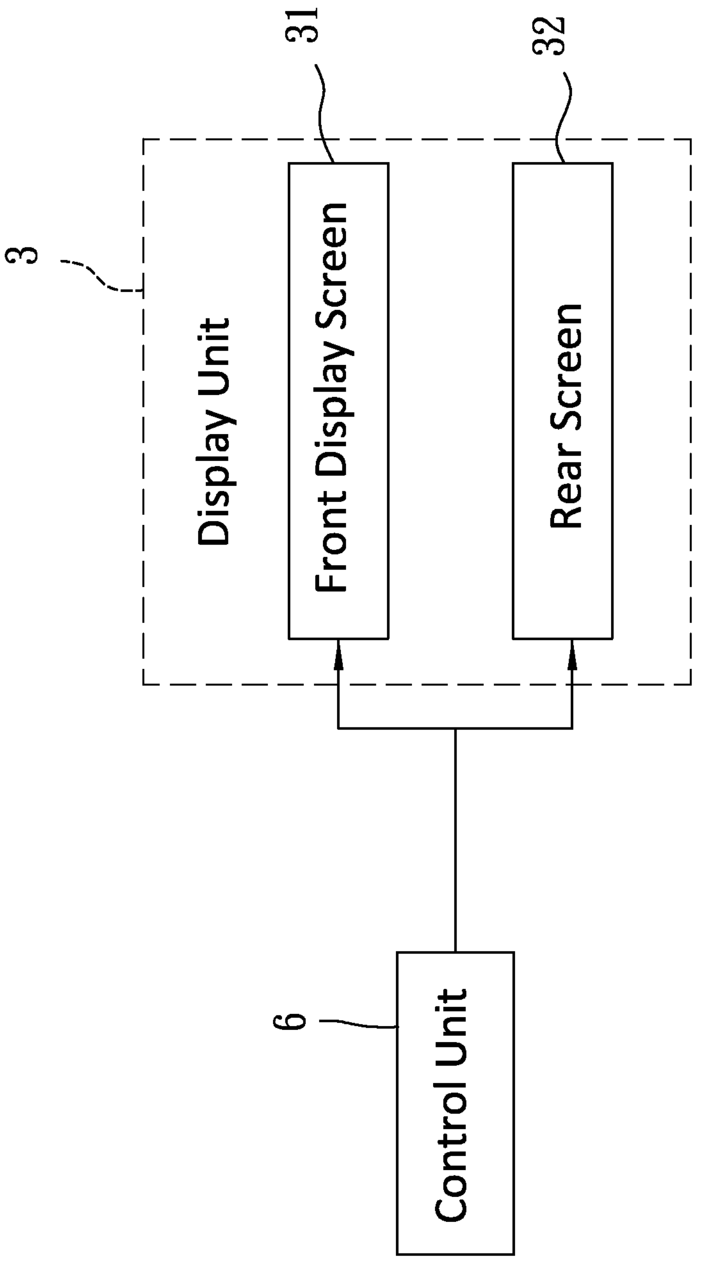
FIG. 4 is a schematic electrical block diagram showing the first preferred embodiment.

Referring to FIGS. 1, 2 and 4, the first preferred embodiment of a display apparatus of the present invention is shown to include a housing 2, a display unit 3, a lighting unit 4, and a control unit 6. The display apparatus can be used for advertisement purposes.

The housing 2 includes a front wall 21 with a front opening 211, a rear wall 22, and a surrounding wall 23 interconnecting the front and rear walls 21, 22 and cooperating with the front and rear walls 21, 22 to define an inner receiving space 20 thereamong. The inner receiving space 20 includes a front space portion 201, and a rear space portion 202 adapted for receiving two samples 1 of merchandise to be exhibited. In this embodiment, the samples 1 are two packs of chewing gums. In addition, the housing 2 further includes a mounting structure 24 disposed in the inner receiving space 20.

The display unit 3 is disposed in the front space portion 201 of the inner receiving space 20, and is mounted on the mounting structure 24. The display unit 3 includes a light-transmissive front display screen 31 and a light-transmissive rear screen 32.

The front display screen 31 is disposed adjacent to the front wall 21 and is exposed through the front opening 211 in the front wall 21. In this embodiment, the front display screen 31 is divided into a left first screen portion 311, and a right second screen portion 312 smaller than the first screen portion 311 (see FIG. 3*b*).

The rear screen 32 is disposed spacedly parallel to the front display screen 31 and distal from the front wall 21. The rear screen 32 is operable to have a first light transmittance and a second light transmittance. In this embodiment, the rear screen 32 is made from an electrochromic material for reversible color changing. Alternatively, the rear screen 32 can be a liquid crystal film that is controlled to switch between light transmission and non-light transmission. Preferably, the second light transmittance is much higher than the first light transmittance. Therefore, when the rear screen 32 has the first light transmittance, a trace amount of light is permitted to pass through the rear screen 32. When the rear screen 32 has the second light transmittance, the rear screen 32 is transparent and colorless. In this embodiment, the rear screen 32 is divided into first and second screen portions 321, 322 corresponding respectively to the first screen portion 311 and the second screen portion 312 of the front display screen 31. It is noted that the samples 1 of merchandise are disposed adjacent to the second screen portion 322 such that the samples 1 of merchandise are visible through the second screen portion 312 of the front display screen 31 and the second screen portion 322 of the rear screen 32 when the rear screen 32 has the second light transmittance. Preferably, the rear screen 32 has a front side surface coated with a transparent reflection film 33 thereon (see FIG. 2). The transparent reflection film 33 is made from a material with light reflection characteristics, such as aluminum or silver.

As shown in FIG. 2, the lighting unit 4 is disposed in the housing 2 and is mounted on the mounting structure 24 for illuminating the display unit 3. In this embodiment, the lighting unit 4 includes a first lighting member and a second lighting member. The first lighting member is received in the rear space portion 202 of the inner receiving space 20 and is disposed adjacent to the rear screen 32 for illuminating the samples 1 of merchandise. In this embodiment, the first lighting member consists of two pairs of lighting tubes 41 opposite to each other in a vertical direction. The second lighting member is disposed between the front display screen 31 and the rear screen 32 for illuminating the front display screen 31. Similarly, in this embodiment, the second lighting member consists of two pairs of lighting tubes 42 opposite to each other in the vertical direction. It is noted that, due to the presence of the reflection film 33, a part of light emitted from the second lighting member is reflected by the reflection film 33 toward the front display screen 31.

Figure 3A:
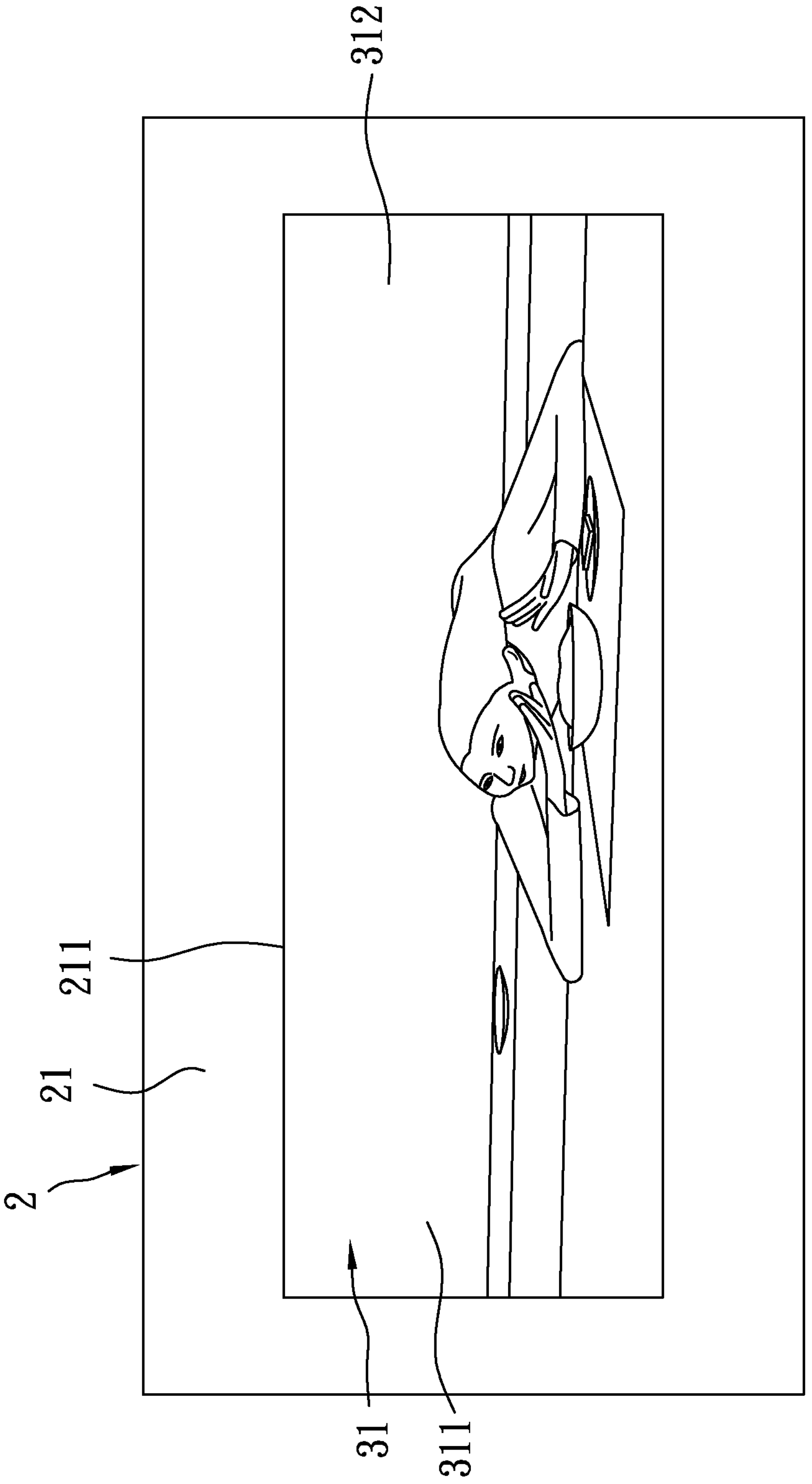
FIG. 3*a* is a schematic front view illustrating the first preferred embodiment when a display unit is operated in a first display state.
Figure 3B:
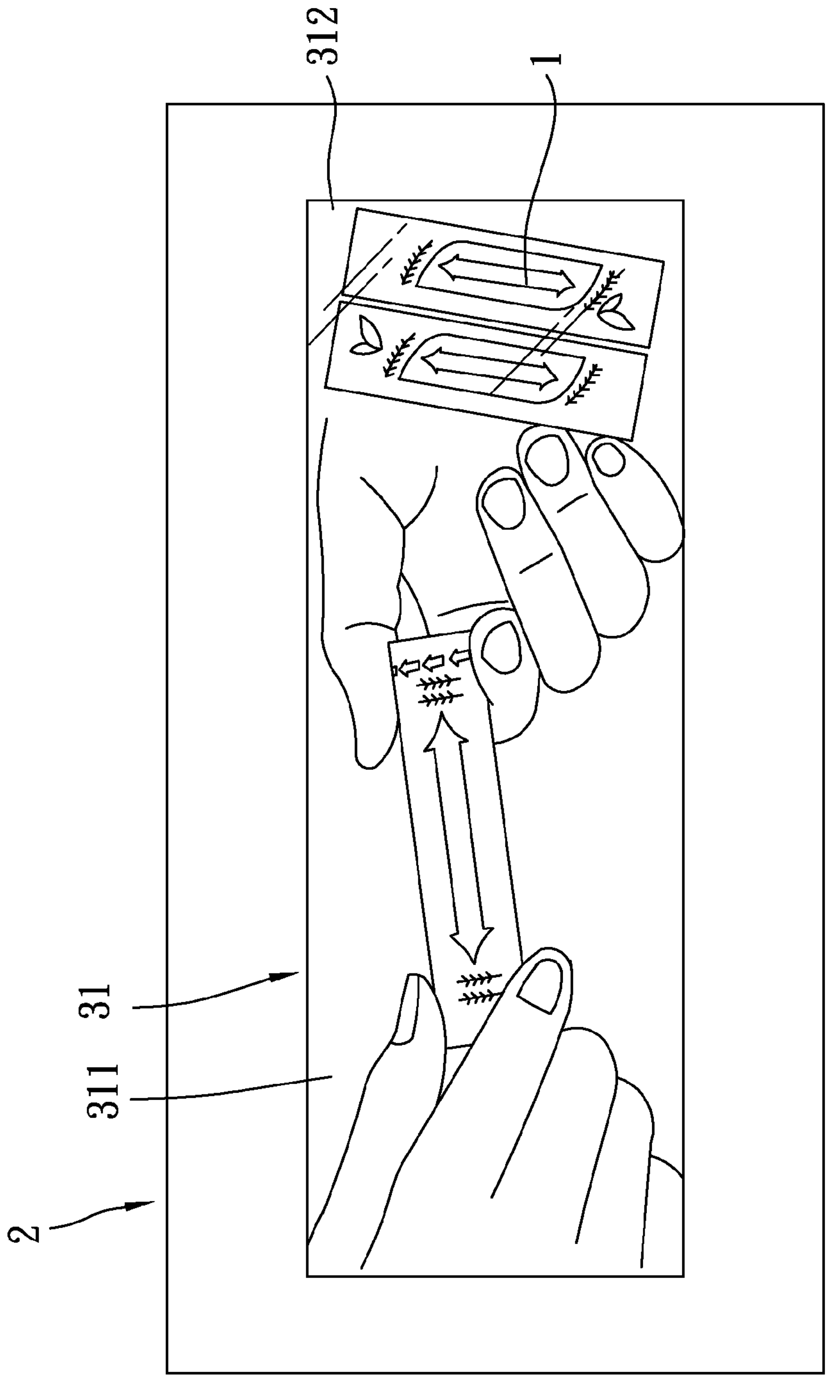
FIG. 3*b* is a schematic front view illustrating the first preferred embodiment when the display unit is operated in a second display state.

The control unit 6 is connected electrically to the display unit 3. In this embodiment, the control unit 6 is configured to control the display unit 3 to alternately switch between a first display state and a second display state. In the first display state, as shown in FIG. 3*a*, the whole front display screen 31 is control led by the control unit 6 to display pre-stored digital image information as dynamic merchandise advertisements while the whole rear screen 32 is controlled by the control unit 6 to have the first light transmittance. In this case, the samples 1 of merchandise in the rear space portion 202 are visible through the front opening 211 of the housing 2. In the second display state, as shown in FIG. 3*b*, only the first screen portion 311 of the front display screen 31 is controlled by the control unit 6 to display pre-stored image information including a plurality of static image pictures, which are associated with the samples 1 of merchandise, while the first and second screen portions 321, 322 of the rear screen 32 are controlled by the control unit 6 to have the first and second light transmittances, respectively. In this case, the samples 1 of merchandise received in the rear space portion 202 of the inner receiving space 20 are visible through the second screen portion 312 of the front display screen 31 and the second screen portion 322 of the rear screen 32, and are finely exhibited through illumination of the second lighting member of the lighting unit 4. Since the feature of this invention does not reside in the configuration of the control unit 6, which may be readily appreciated by those skilled in the art, details of the same are omitted herein for the sake of brevity.

In use, especially in the second display state of the display unit 3, the finely exhibited samples 1 of merchandise and the image information displayed on the first screen portion 311 of the front display screen 31 can achieve superior advertisement effects.

FIGS. 5 to 9 show the second preferred embodiment of a display apparatus according to this invention, which is a modification of the first preferred embodiment. In this embodiment, the display apparatus is implemented into a vending machine.

In this embodiment, the housing 2 serves as a machine housing, and the inner receiving space 20 in the housing 2 further includes an additional space portion (not shown) for accommodating various merchandise to be sold (not shown), such as chewing gums, beverages, cookies, candies, etc. In addition, the rear space portion 202 of the inner receiving space 20 is divided into a plurality of sample-accommodating portions 203 each adapted to accommodate an individual sample 1 of the merchandise to be exhibited. Furthermore, the mounting structure 24 includes a plurality of partition walls 25 disposed in the rear space portion 202 of the inner receiving space 20 to define the sample-accommodating portions 203 of the rear space portion 202.

In this embodiment, for the display unit 3, the rear screen 32 is divided into a plurality of screen portions 323 corresponding respectively to the sample accommodating portions 203 of the rear space portion 202 of the inner receiving space 20. The front display screen 31 is divided into a plurality of screen portions 313 corresponding respectively to the screen portions 323 of the rear screen 32.

Figure 5:
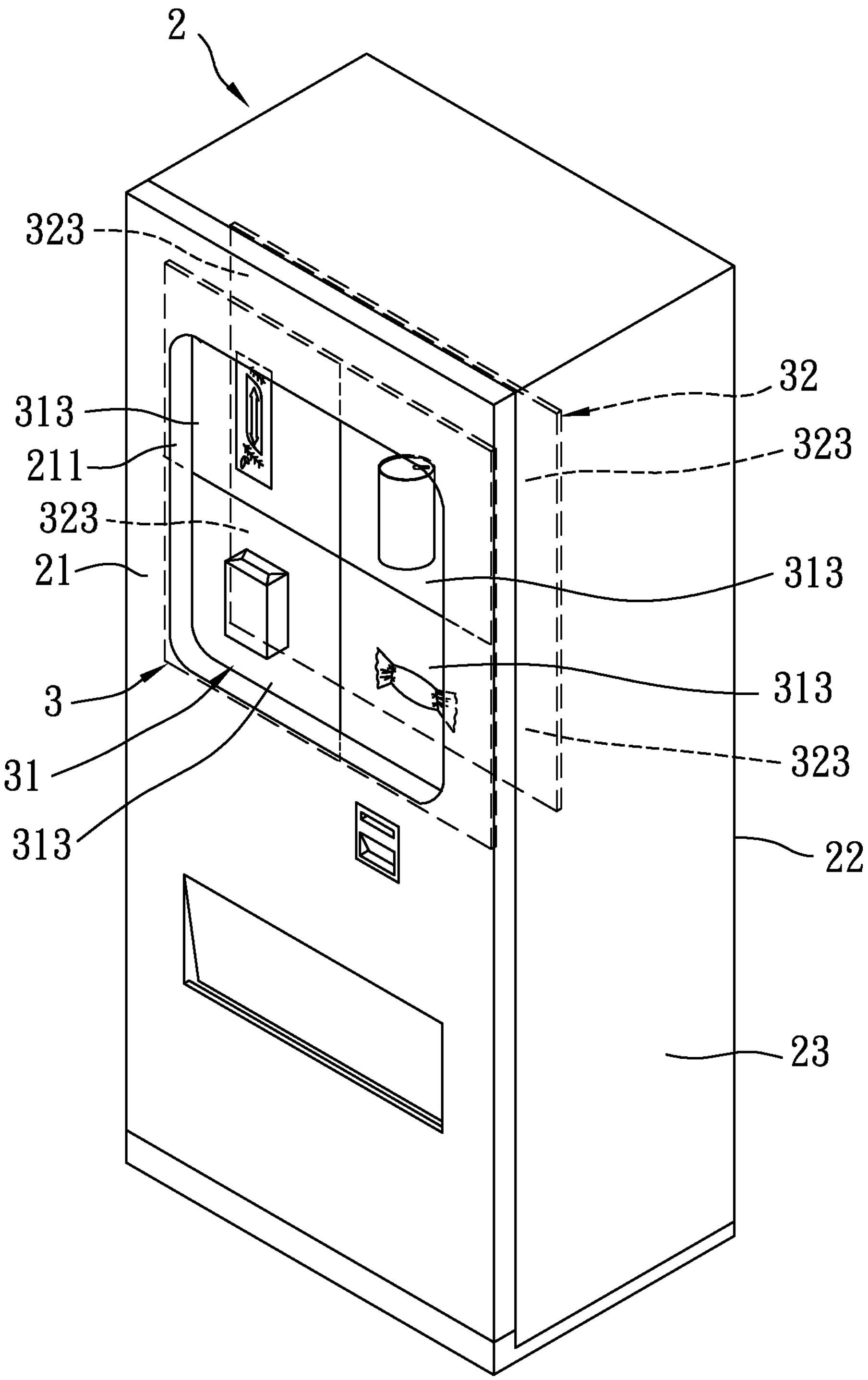
FIG. 5 is a perspective view showing the second preferred embodiment of a display apparatus according to the present invention.
Figure 6:
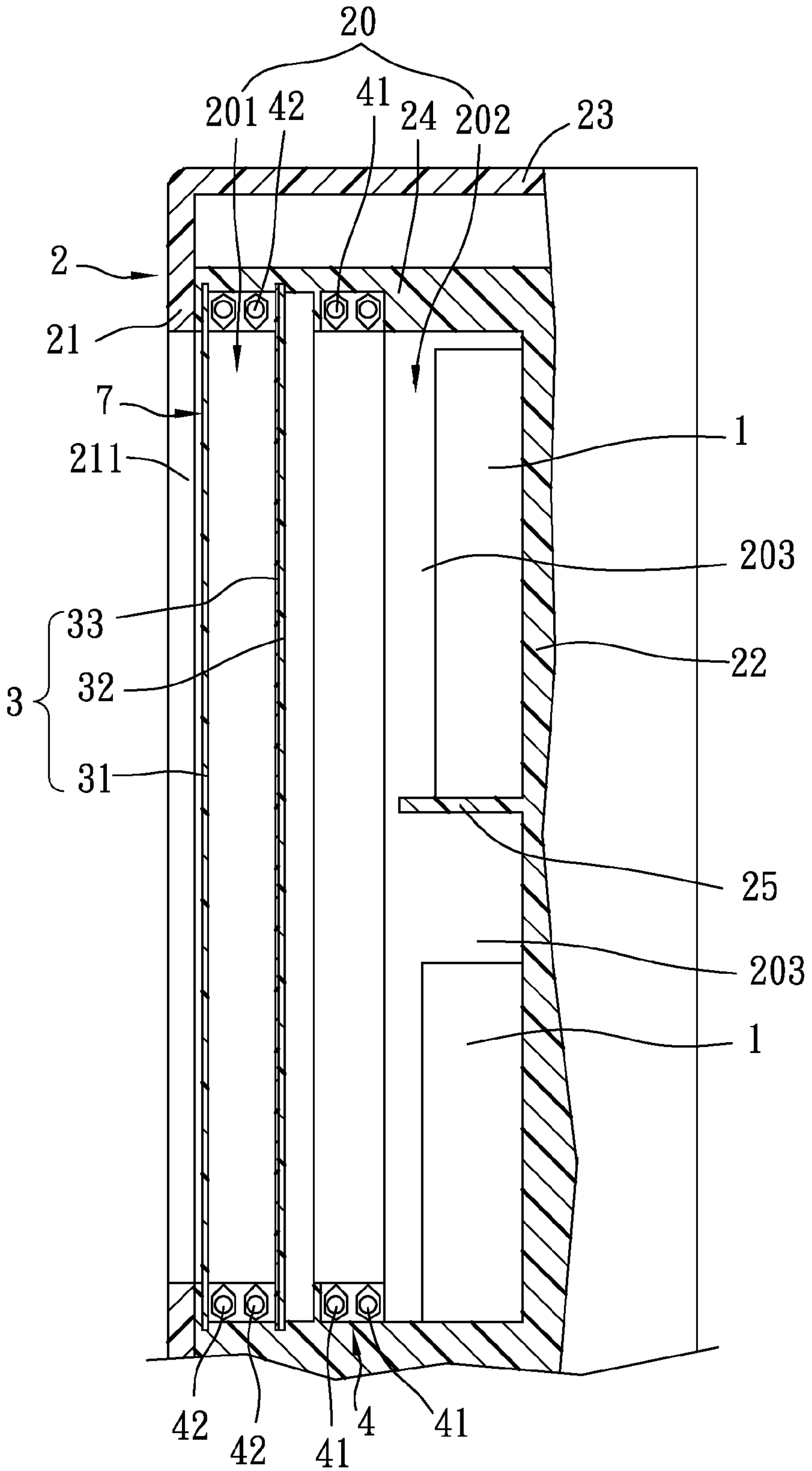
FIG. 6 is a schematic partly sectional view showing the second preferred embodiment.
Figure 7:
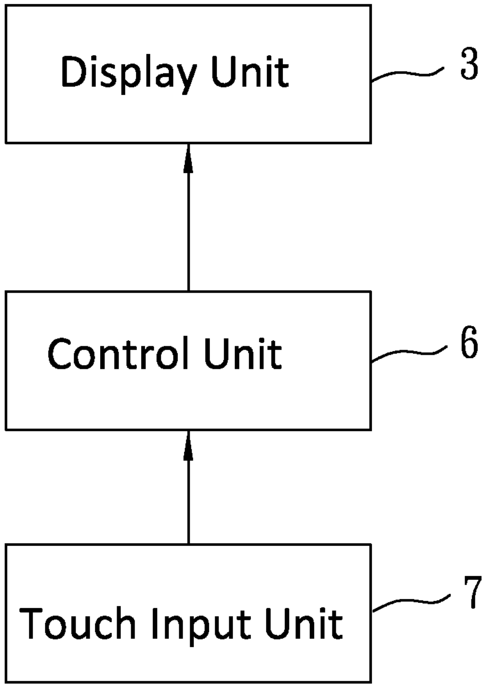
FIG. 7 is a schematic electrical block diagram showing the second preferred embodiment.
Figure 8:
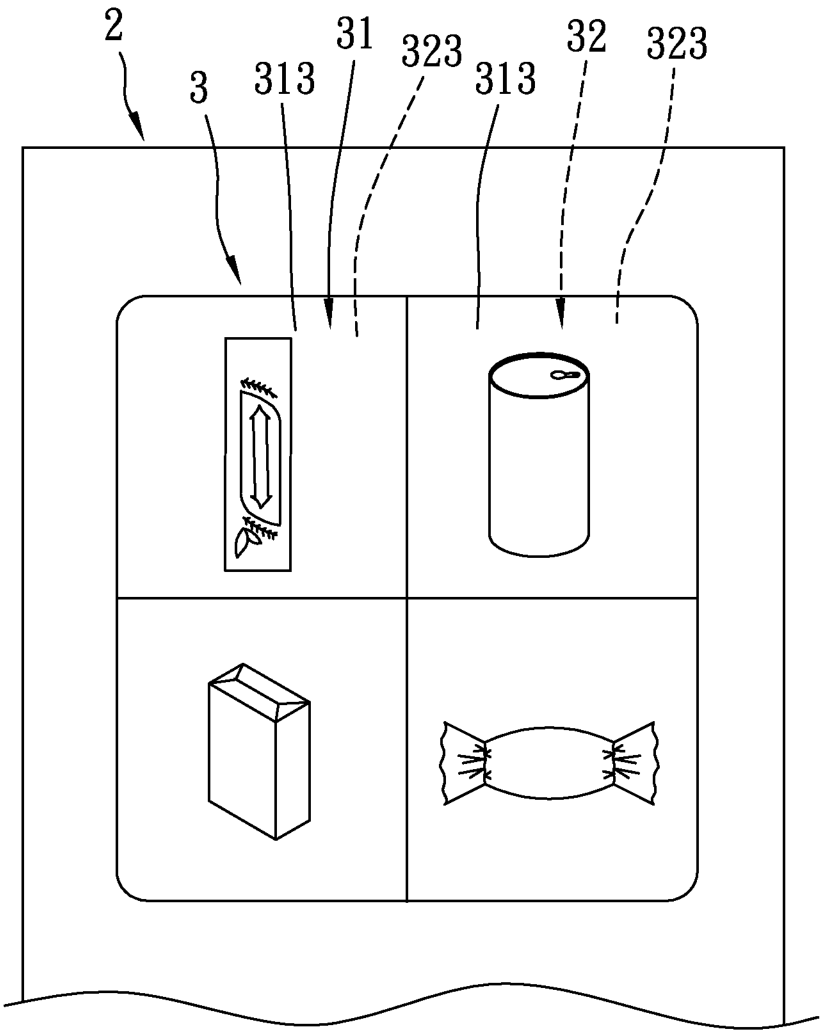
FIG. 8 is a fragmentary schematic front view showing the second preferred embodiment in a normal state.
Figure 9:
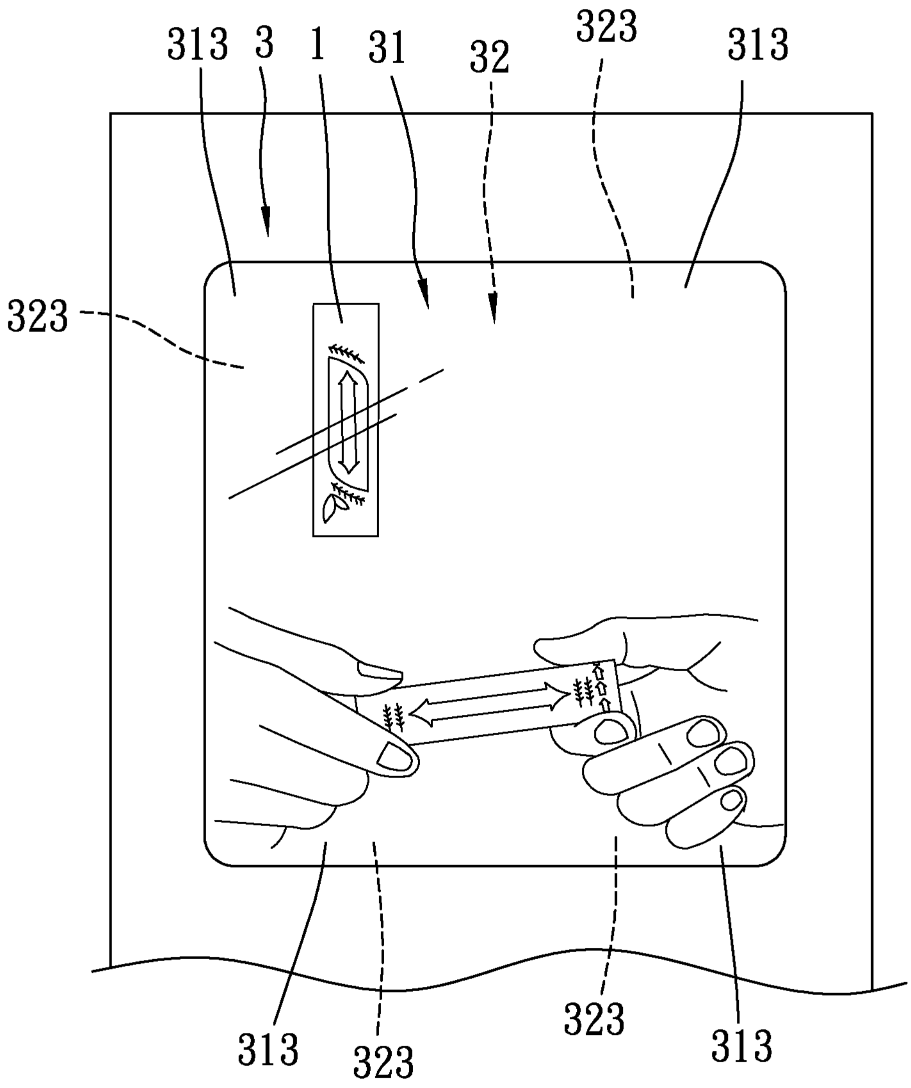
FIG. 9 is a fragmentary schematic front view showing the second preferred embodiment in an operated state.

In this embodiment, the control unit 6 is configured to control the display unit 3 so that the display unit 3 is operable between a normal state and an operated state. In the normal state, as shown in FIGS. 5 and 8, each of the screen portions 313 of the front display screen 31 is controlled by the control unit 6 to display a static image picture associated with the sample 1 of merchandise accommodated in a corresponding sample-accommodating portion 203 of the rear space portion 202 while the whole rear screen 32 is controlled by the control unit 6 to have the first light transmittance. In the operated state, as shown in FIG. 9, a selected screen portion 313 of the front display screen 31 is controlled by the control unit 6 to cease display of the static image picture while the other screen portions 313 of the front display screen 31 are controlled by the control unit 6 to cooperatively display dynamic image information associated with the static image picture displayed on the selected screen portion 313 of the front display screen 31 during the normal state. At the same time, one screen portion 323 of the rear screen 32 corresponding to the selected screen portion 313 of the front display screen 31 is controlled by the control unit 6 to have the second light transmittance while the other screen portions 323 of the rear screen 32 are controlled by the control unit 6 to have the first light transmittance such that the sample 1 of merchandise accommodated in the corresponding sample-accommodating portion 203 of the rear space portion 202 is visible through the selected screen portion 313 of the front display screen 31 and the screen portion 323 of the rear screen 32.

Furthermore, the display apparatus further includes a touch input unit 7 mounted on the housing 2, disposed on the front display screen 31 of the display unit 3 and connected electrically to the control unit 6. The touch input unit 7 is operable to generate an input signal in response to movement of an object, which is located above the selected screen portion 313 of the front display screen 31, on or near the touch input unit 7. Then, the touch input unit 7 outputs the input signal to the control unit 6 such that the control unit 6 controls the display unit 3 to switch from the normal state to the operated state in response of the input signal from the touch input unit 7. In this embodiment, the touch input unit 7 includes one of a capacitive-sensing touch input device, a thermal-sensing touch input device and an optical-sensing touch input device.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display apparatus comprising:

a housing formed with a front opening;

a display unit disposed in said housing, and including a light-transmissive front display screen exposed through said front opening, and a light-transmissive rear screen disposed spacedly parallel to said front display screen, and operable to have a first light transmittance, and a second light transmittance higher than the first light transmittance; and a lighting unit disposed in said housing for illuminating said display unit, wherein:

said housing includes a front wall with said front opening, a rear wall, and a surrounding wall interconnecting said front and rear walls and cooperating with said front and rear walls to define an inner receiving space thereamong;

said inner receiving space includes a front space portion for receiving said display unit therein, and a rear space portion adapted for receiving at least one sample of merchandise to be exhibited;

said front display screen is divided into a first screen portion and a second screen portion;

said rear screen is divided into first and second screen portions corresponding respectively to said first and second screen portions of said front display screen; and said display apparatus further comprises a control unit connected electrically to said display unit and configured to control said display unit to switch between a first display state, where said whole front display screen is controlled by said control unit to display image information and where said whole rear screen is controlled by said control unit to have the first light transmittance, and a second display state, where only said first screen portion of said front display screen is controlled by said control unit to display image information associated with the sample of merchandise and where said first and second screen portions of said rear screen are controlled by said control unit to have the first and second light transmittances, respectively, such that the sample of merchandise received in said rear space portion of said inner receiving space in said housing is visible through said second screen portion of said front display screen and said second screen portion of said rear screen.

2. The display apparatus as claimed in claim 1, wherein said lighting unit includes a first lighting member received in said rear space portion of said inner receiving space and disposed adjacent to said rear screen for illuminating the sample of merchandise.

3. The display apparatus as claimed in claim 2, wherein said lighting unit further includes a second lighting member disposed between said front display screen and said rear screen for illuminating said front display screen.

4. The display apparatus as claimed in claim 3, wherein said rear screen has a front side surface coated with a transparent reflection film thereon for reflecting a part of light emitted from said second lighting member of said lighting unit toward said front display screen.

5. A display apparatus comprising:

a housing formed with a front opening;

a display unit disposed in said housing, and including a light-transmissive front display screen exposed through said front opening, and a light-transmissive rear screen disposed spacedly parallel to said front display screen, and operable to have a first light transmittance, and a second light transmittance higher than the first light transmittance; and a lighting unit disposed in said housing for illuminating said display unit, wherein:

said housing includes a front wall with said front opening, a rear wall, and a surrounding wall interconnecting said front and rear walls and cooperating with said front and rear walls to define an inner receiving space thereamong;

said inner receiving space includes a front space portion for receiving said display unit therein, and a rear space portion adapted for receiving at least one sample of merchandise to be exhibited; said rear space portion of said inner receiving space in said housing is divided into a plurality of sample-accommodating portions each adapted to accommodate an individual sample of merchandise to be exhibited;

said rear screen is divided into a plurality of screen portions corresponding respectively to said sample-accommodating portions of said rear space portion of said inner receiving space in said housing;

said front display screen is divided into a plurality of screen portions corresponding respectively to said screen portions of said rear screen; and said display apparatus further comprises a control unit connected electrically to said display unit, and configured to control said display unit so that said display unit is operable between a normal state, where each of said screen portions of said front display screen is controlled by said control unit to display a static image picture associated with the sample of merchandise accommodated in a corresponding one of said sample-accommodating portions of said rear space portion, and where said whole rear screen is controlled by said control unit to have the first light transmittance, and an operated state, where a selected one of said screen portions of said front display screen is controlled by said control unit to cease display of the static image picture while the other ones of said screen portions of said front display screen are controlled by said control unit to cooperatively display dynamic image information associated with the static image picture displayed on the selected one of said screen portions of said front display screen during the normal state, and where one of said screen portions of said rear screen corresponding to the selected one of said screen portions of said front display screen is controlled by said control unit to have the second light transmittance while the other ones of said screen portions of said rear screen are controlled by said control unit to have the first light transmittance such that the sample of merchandise accommodated in the corresponding one of said sample-accommodating portions of said rear space portion is visible through the selected one of said screen portions of said front display screen and said one of said screen portions of said rear screen.

6. The display apparatus as claimed in claim 5, wherein said housing further includes a mounting structure disposed in said inner receiving space and mounted with said display unit and said lighting unit thereon, said mounting structure including at least one partition wall disposed in said rear space portion of said inner receiving space to define said sample-accommodating portions of said rear space portion.

* * * * *